(12) United States Patent
Shikanai

(10) Patent No.: US 8,693,378 B2
(45) Date of Patent: Apr. 8, 2014

(54) WIRELESS TERMINAL DEVICE AND METHOD OF CONTROLLING THE SAME

(75) Inventor: Hiroshi Shikanai, Yokohama (JP)

(73) Assignee: Kyocera Corporation, Kyoto (JP)

( * ) Notice: Subject to any disclaimer, the term of this patent is extended or adjusted under 35 U.S.C. 154(b) by 258 days.

(21) Appl. No.: 13/152,744

(22) Filed: Jun. 3, 2011

(65) Prior Publication Data

US 2011/0299503 A1    Dec. 8, 2011

(30) Foreign Application Priority Data

Jun. 4, 2010   (JP) ................. 2010-128991

(51) Int. Cl.
*H04B 7/005*   (2006.01)
*H04L 12/28*   (2006.01)

(52) U.S. Cl.
USPC .......................................... 370/278; 370/401

(58) Field of Classification Search
USPC ................... 370/278, 282, 331, 401
See application file for complete search history.

(56) References Cited

U.S. PATENT DOCUMENTS

| | | | |
|---|---|---|---|
| 6,738,825 B1 * | 5/2004 | Bortolotto et al. ............ | 709/238 |
| 7,603,574 B1 * | 10/2009 | Gyugyi et al. ................ | 713/300 |
| 2002/0080727 A1 * | 6/2002 | Kim et al. ..................... | 370/252 |
| 2003/0212816 A1 | 11/2003 | Bender et al. | |
| 2003/0220110 A1 * | 11/2003 | Kizu et al. .................... | 455/445 |

FOREIGN PATENT DOCUMENTS

| | | |
|---|---|---|
| CA | 2485616 A1 | 11/2003 |
| JP | 05-207023 | 8/1993 |
| JP | 2005-525748 A | 8/2005 |
| WO | 03-096635 A1 | 11/2003 |

OTHER PUBLICATIONS

Communication from foreign patent office for a counterpart foreign application dated Dec. 24, 2013.
Partial translation of the communication from the foreign patent office for the counterpart application.

* cited by examiner

*Primary Examiner* — Hong Cho
(74) *Attorney, Agent, or Firm* — Hoffmann & Baron, LLP

(57) ABSTRACT

To provide a wireless terminal device that can control so that the size of RWIN of an electronic device on a receiving side changes to an optimum value when hand-down (hand-off) from high speed communication to low speed communication occurs, and a method for controlling the same. A wireless terminal device 1 includes: a first communication unit (10) that is connected to a PC (101) and performs communication with a network (202) side at a first communication speed; a second communication unit (11) that is connected to the PC (101) and performs communication with the network (202) side at a second communication speed that is faster than the first communication speed, and a control unit (12) that reciprocally switches between the first communication unit (10) and the second communication unit (11).

10 Claims, 7 Drawing Sheets

WIRELESS TERMINAL DEVICE AND METHOD OF CONTROLLING THE SAME

This application is based on and claims the benefit of priority from Japanese Patent Application No. 2010-128991, filed on 4 Jun. 2010, the content of which is incorporated herein by reference.

BACKGROUND OF THE INVENTION

1. Field of the Invention

The present invention relates to a wireless terminal device having a plurality of communication units and a control method thereof.

2. Related Art

The communication of data is performed in accordance with a predetermined protocol (e.g., TCP/IP (Transmission Control Protocol/Internet Protocol)) between electronic devices carrying out communication via a network (e.g., Japanese Unexamined Patent Application, Publication No. H5-207023).

In addition, recent electronic devices have a function of setting an interval to send reception confirmation of data to an electronic device on the sending side (hereinafter referred to as RWIN (Receive Window)) when sending and receiving data via TCP/IP.

Herein, it is configured so as to frequently send reception confirmation of data to an electronic device on a sending side in a case of RWIN being too small compared to the speed of a communication line of the network. When this is done, since the electronic device on the sending side does not send subsequent data until reception confirmation is sent, the time required for the round trip of reception confirmation is all time loss, and the communication speed will slow by this amount.

On the other hand, in a case of RWIN being too large compared to the speed of the communication line of the network, the time required to resend when incorrect data is flowing lengthens, and the communication speed slows in this case as well.

Therefore, it has been desired for the electronic device on the receiving side to appropriately set the set value of RWIN while taking into consideration the speed of the communication line of the network.

SUMMARY OF THE INVENTION

However, the electronic device assumes a form using a PC card in a case of connecting with a network. In addition, there are PC cards that have a first communication unit that can communicate at a first communication speed and a second communication unit that can communicate faster than the first communication speed depending on the communication environment.

Herein, in a case of performing communication with an electronic device by connecting with the PC card, the communication environment changes, and processing of changing communication units from the second communication unit to the first communication unit (hand-down) may occur. In such a case, since hand-down of the PC card cannot be notified, the electronic device cannot change the set value of RWIN immediately, even if a drastic decline in the communication rate occurs due to the hand-down, and thus efficient data transfer cannot be performed.

Therefore, the present invention has an object of providing a wireless terminal device that can control so that the size of RWIN of an electronic device on a receiving side is changed to an optimum value when hand-down from a high speed communication line to a low speed communication line (hand-off) occurs, and a method for controlling the same.

In order to solve the above-mentioned problems, a wireless terminal device according to the present invention includes: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, in which the control unit is of a configuration that causes data received from the network side via the second communication unit to be delayed by a predetermined time and then sends to the external device, in a case of performing switching from the second communication unit to the first communication unit.

Furthermore, with the wireless terminal device, it is preferable for the control unit to cancel a reception confirmation signal sent from the external device and to resend data received from the network side to the external device, in a case of performing the switching from the second communication unit to the first communication unit, and
wherein the reception confirmation signal indicates that reception of data ended normally.

Additionally, with the wireless terminal device, it is preferable for the control unit to initiate processing to cause the data to be delayed by a predetermined time before performing switching from the second communication unit to the first communication unit, and to stop the processing to cause the data to be delayed by a predetermined time after performing switching.

Moreover, with the wireless terminal device, it is preferable for the control unit to stop processing to resend data received from the network side to the external device after performing switching from the second communication unit to the first communication unit.

Moreover, with the wireless terminal device, it is preferable for the control unit sends data received from the network side via the second communication unit to the external device with a predetermined time delay at the switching from the second communication unit to the first communication unit, and the control unit stops the processing of the predetermined time delay, in a case where an interval of sending a reception confirmation signal from the external device to the network side does not change even if a predetermined time period elapses after the predetermined time delay.

Moreover, with the wireless terminal device, it is preferable for the control unit cancels the reception confirmation signal at the switching from the second communication unit to the first communication unit, and the control unit stops the processing of resending data received from the network side to the external device, in a case where an interval of sending a reception confirmation signal from the external device to the network side does not change even if the data received from the network side is resent to the external device.

In addition, in order to solve the above-mentioned problems, a wireless terminal device according to the present invention includes: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, in which the control unit is of a confirmation that cancels a reception confirmation signal sent from the external device and resends data received from the network side to the external device, in a case of performing the switching from the second communication unit to the first communication unit, and the reception confirmation signal indicating that reception of data ended normally.

Moreover, with the wireless terminal device, it is preferable for the control unit stops processing to resend data received from the network side to the external device after performing switching from the second communication unit to the first communication unit.

Furthermore, with the wireless terminal device, it is preferable for the control unit sends data received from the network side via the second communication unit to the external device with a predetermined time delay at the switching from the second communication unit to the first communication unit, and the control unit stops the processing of the predetermined time delay, in a case where an interval of sending a reception confirmation signal from the external device to the network side does not change even if a predetermined time period elapses after the predetermined time delay.

Additionally, in order to solve the above-mentioned problems, according to the present invention, in a method for controlling a wireless terminal device having: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, the method includes the steps of: delaying data received from the network side via the second communication unit by a predetermined time, in a case of the control unit performing switching from the second communication unit to the first communication unit; and sending the data received from the network side to the external device, after being delayed by a predetermined time in the delaying step.

In addition, it is preferable for the method for cancelling a reception confirmation signal sent from the external device, in a case of the control unit performing switching from the second communication unit to the first communication unit; and resending the data received from the network side to the external device.

Moreover, in order to solve the above-mentioned problems, according to the present invention, in a method for controlling a wireless terminal device having: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, the method includes the steps of: cancelling a reception confirmation signal sent from the external device ended normally, in a case of the control unit performing switching from the second communication unit to the first communication unit; and resending the data received from the network side to the external device, and the reception confirmation signal indicates that reception of data ended normally.

According to the present invention, it is possible to control so that the size of RWIN of an electronic device on a receiving side is changed to an optimum value when hand-down (handoff) from a high speed communication line to a low speed communication line occurs.

DETAILED DESCRIPTION OF THE INVENTION

Figure 1:
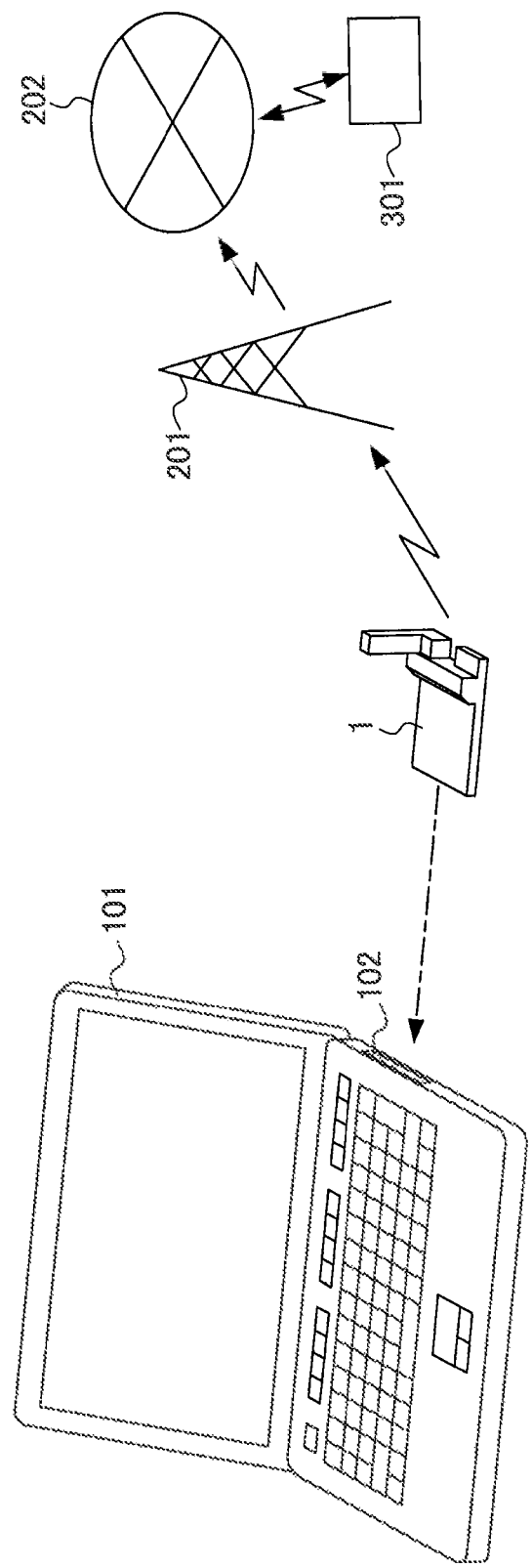
FIG. 1 is a view showing an appearance of a wireless terminal device according to an embodiment of the present invention connected to a PC and connected to a network.

Hereinafter, embodiments of the present invention will be explained in detail. A wireless terminal device 1 according to an embodiment of the present invention is used in a PC card possessing a plurality of antennas for wireless communication, and is used to connect to a network 202 via a base station by a PC 101 (Personal Computer), by way of inserting and connecting to a card slot 102 of the PC 101, as shown in FIG. 1. In addition, a data receiving side is referred to as PC 101 and a data sending side is referred to as PC 301 in the following explanation.

Figure 2:
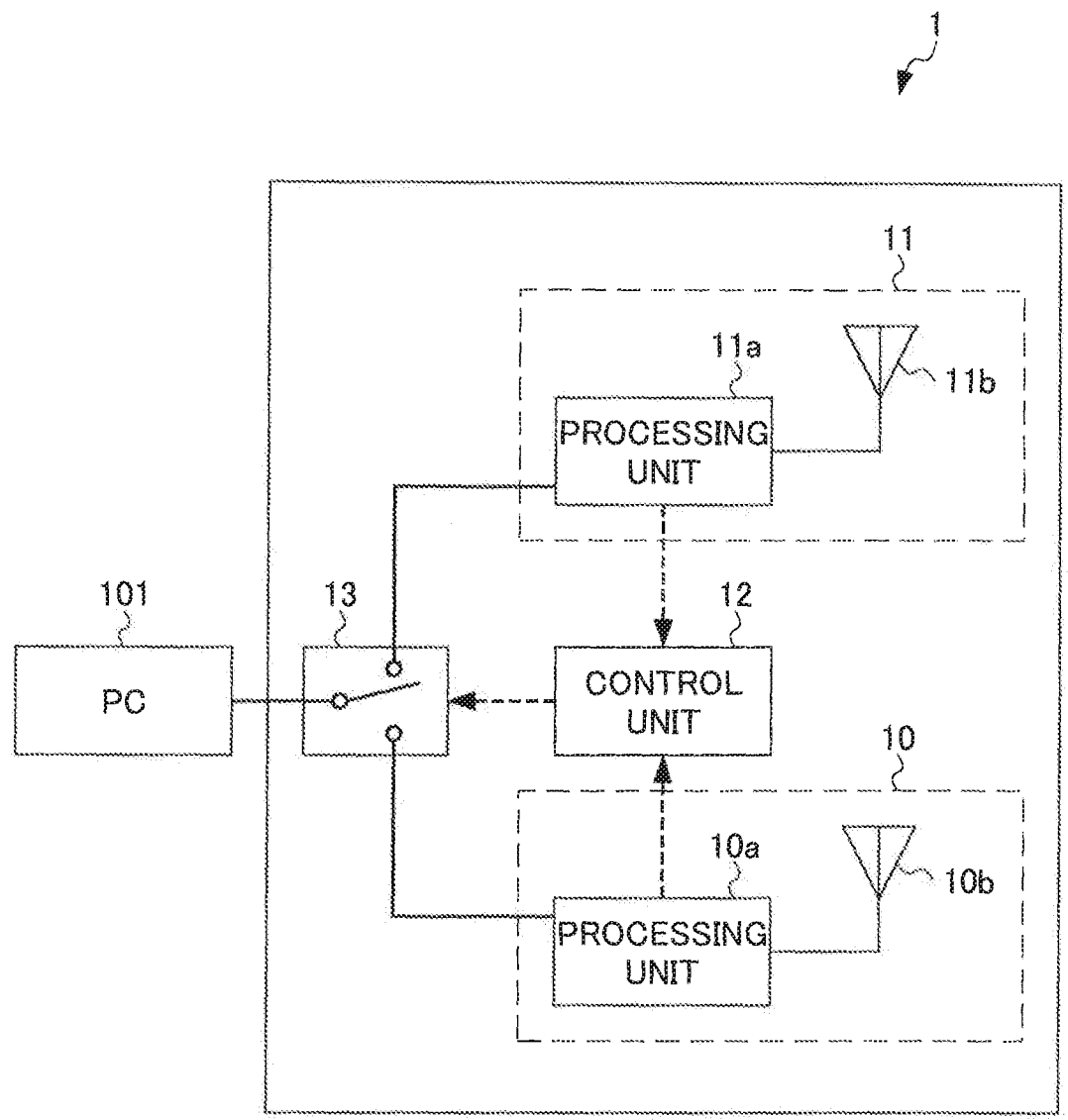
FIG. 2 is a block diagram showing a configuration of the wireless terminal device.

The wireless terminal device 1 includes a first communication unit 10, a second communication unit 11, a control unit 12, and a switching unit 13, as shown in FIG. 2.

The first communication unit 10 has a processing unit 10a and an antenna 10b, connected to the PC 101, and performs communication with a network 202 side at a first communication speed. The first communication unit 10 has a function of performing data communication according to the CDMA (Code Division Multiple Access) standard, for example.

The second communication unit 11 has a processing unit 11a and an antenna 11b, connects to the PC 101, and performs communication with a network 202 side at a second communication speed that is faster than the first communication speed. In addition, the second communication unit 11 has a function of performing data communication according to the LTE (Long Term Evolution) standard.

The control unit 12 controls the switching unit 13 to reciprocally switch between the first communication unit 10 and the second communication unit 11. The control unit 12 causes a predetermined time delay to occur in sending data received from the network 202 side via the second communication unit 11 to the PC 101 in a case of performing switching from the second communication unit 11 to the first communication unit 10.

Since the data being received from the network 202 side is sent after delaying a predetermined time, the PC 101 determines that the network side cannot handle the current communication speed and changes to make a set value of RWIN (Receive Window) to be slow speed.

Herein, the relationship between the set value of RWIN and the speed of the communication line of the network 202 will be explained. It should be noted that RWIN refers to a function of setting an interval at which to send data reception conformation (the ACK packet described later) to a PC 301 on the sending side when sending and receiving data via TCP/IP. In addition, the set value of RWIN being large means that the data volume is large when performing one occurrence of sending and receiving, and since sending and receiving data is performed efficiently, it is possible to realize high speed data communication.

In addition, the set value of RWIN being small means that the data volume is small when performing one occurrence of sending and receiving, and thus is better when the speed of the communication line is low speed.

In addition, in a case of RWIN being too small compared to the speed of the communication line of the network 202, data reception confirmation is frequently sent to the PC 301 on the sending side. When this is done, the PC 301 on the sending side does not send subsequent data until reception confirmation has been sent; therefore, the time taken for the round trip of reception confirmation and the time waiting for reception confirmation is all time loss, whereby the communication rate may slow by this.

In addition, in a case of RWIN being too large compared to the rate of the communication line of the network, even if it is determined to be necessary to resend when incorrect data has been received, since it is necessary to wait until the data reception of the RWIN portion completes, and then resend, the time taken to resend may lengthen, and the communication rate may slow in this case.

Therefore, it has been desired for the PC 101 to suitably set the set value of RWIN while taking into consideration the speed of the communication line of the network. More specifically, the PC 101 can perform efficient data transfer by decreasing the set value of RWIN in a case of using the first communication unit 10, and increasing the set value of RWIN in a case of using the second communication unit 11.

Then, since data received from the network 202 side is sent to the PC 101 after delaying a predetermined time when executing processing of hand-down (hand-off) from the second communication unit 11 to the first communication unit 10, the wireless terminal device 1 can prompt the PC 101 to decrease the set value of RWIN. In addition, since the processing of hand-down from the second communication unit 11 to the first communication unit 10 is executed after the set value of RWIN has been decreased by the PC 101, the wireless terminal device 1 can maintain efficient throughput.

Moreover, it is preferable for the control unit 12 to initiate processing to delay the data by a predetermined time prior to performing switching from the second communication unit 11 to the first communication unit 10 (hand-down), and to stop the processing to delay the data by a predetermined time after having performed switching.

Since the wireless terminal device 1 stops the processing to delay the data by a predetermined time after hand-down has been performed by configuring in this way, data reception can be performed as usual thereafter using the first communication unit 10.

Furthermore, in a case of performing switching from the second communication unit 11 to the first communication unit 10, it is preferable for the control unit 12 to send data received from the network 202 side via the second communication unit 11 to the PC 101 after having been delayed by a predetermined time, and in a case of the interval at which to send to the network 202 side a reception confirmation signal indicating that the reception of data from the PC 101 has ended normally does not changed, even if a predetermined time has elapsed, it is preferable for the control unit 12 to stop the processing to delay the data by a predetermined time.

In this case, since it can be determined that the PC 101 does not have a function of changing the set value of RWIN, the wireless terminal device 1 can achieve a reduction in the processing load by stopping the processing to delay the data by a predetermined time.

In addition, in a case of performing switching from the second communication unit 11 to the first communication unit 10, it is preferable for the control unit 12 to cancel the reception confirmation signal of the fact that reception of data received from the PC 101 has ended normally, without sending to the network 202 side via the second communication unit 11, and to resend data received from the network 202 side to the PC 101.

Since identical data is received again, the PC 101 determines that the reception confirmation signal does not reach the sending side (PC 301) and the network 202 side cannot handle the current communication speed, and thus changes to make the size of RWIN (Receive Window) smaller. In addition, since a reception confirmation signal is sent again from the PC 101, the wireless terminal device 1 sends this reception confirmation signal to the network 202 side. It should be noted that the control unit 12 may perform the processing to resend data a plurality of times.

By configuring in this way, when executing the processing of hand-down from the second communication unit 11 to the first communication unit 10, the wireless terminal device 1 cancels the reception confirmation signal without sending to the network 202 side, and resends the data received from the network 202 side to the PC 101; therefore, the wireless terminal device 1 can prompt the PC 101 to decrease the size of RWIN. In addition, since the processing of hand-down from the second communication unit 11 to the first communication unit 10 is executed after the size of RWIN has been decreased by the PC 101, the wireless terminal device 1 can maintain efficient throughput.

It is preferable for the control unit 12 to stop the processing to resend the data received from the network 202 side to the PC 101 after having performed switching (hand-down) from the second communication unit 11 to the first communication unit 10.

By configuring in this way, since the processing to resend data is stopped after hand-down has been performed, the wireless terminal device 1 can perform data reception as usual thereafter using the first communication unit 10.

In a case of performing switching from the second communication unit 11 to the first communication unit 10, it is preferable for the control unit 12 to cancel the reception confirmation signal indicating that reception of data received from the PC 101 ended normally without sending to the network 202 side via the second communication unit 11, and in a case of the interval at which to send to the network 202 side a reception confirmation signal indicating that reception of data from the PC 101 ended normally does not change, even if the data received from the network 202 side is resent to the PC 101, it is preferable for the control unit 12 to stop the processing of resending data received from the network 202 side to the PC 101.

In this case, since it can be determined that the PC 101 does not have a function of changing the set value of RWIN, the wireless terminal device 1 can achieve a reduction in the processing load by stopping the processing of resending data.

In addition, in a case of performing switching from the second communication unit 11 to the first communication unit 10, the control unit 12 sends the data received from the network 202 side via the second communication unit 11 to the PC 101 after delaying by a predetermined time. Moreover, in a case of performing switching from the second communication unit 11 to the first communication unit 10, it is preferable for the control unit 12 to cancel the reception confirmation signal indicating that reception of data received from the PC 101 ended normally without sending to the network 202 side via the second communication unit 11, and to resend the data received from the network 202 side to the PC 101.

Since the data having been received from the network 202 side is delayed by a predetermined time and then sent, or identical data to the data received from the network 202 side is resent, the PC 101 determines that the network side cannot handle the current communication speed and changes the size of RWIN (Receive Window) to a smaller value.

By configuring in this way, since the data received from the network 202 side is delayed by a predetermined time and then sent to the PC 101, or the reception confirmation signal indicating to send to the network 202 side is cancelled and the data received from the network 202 side is resent to the PC 101 when executing processing of hand-down from the second communication unit 11 to the first communication unit 10, the wireless terminal device 1 can prompt the PC 101 to make the size of RWIN an optimum value (small value).

In addition, since processing of hand-down from the second communication unit 11 to the first communication unit 10 is executed after the set value of RWIN has been decreased by the PC 101, the wireless terminal device 1 can realize efficient data transfer.

Example 1

Next, an example of the wireless terminal device 1 will be explained.

The wireless terminal device 1 will be explained by assuming a case of having so-called dual communication function of handing the two communication standards exemplified as LTE and CDMA as described above, and the wireless terminal device 1 making a connection to the network 202 by connecting to a PC 101 with a USB cable or the like, and seamlessly moving to a CDMA area while receiving data in an LTE area.

In addition, the line speed suddenly declines when performing hand-off to bridge between communication standards from the LTE area to the CDMA area, so called hand-down. As a result, in order to main high throughput, it is necessary to change RWIN to the appropriate size in accordance with the line speed.

In addition, with the present example, the OS (Operating System) of the PC 101 is assumed to have a function of automatically setting the size of RWIN to the optimum value.

Herein, the TCP layer on the PC 101 side does not have a mechanism to notify the occurrence of hand-off of a wire-less layer on the wireless terminal device 1 side; therefore, the matter of the line speed being slow after hand-down from LTE to CDMA is actually detected based on the round trip time (RTT) or the like, and the size of RWIN is adjusted. Therefore, from hand-down until the size of RWIN is adjusted, the PC 101 cannot maintain efficient throughput since communication is performed at a size of RWIN that is large for LTE.

The wireless terminal device 1 sets advance sensing the occurrence of hand-down, and adjusting RWIN of the PC 101 to an appropriate value prior to the hand-down being actually executed as one object thereof.

A case of sending data packets from the PC 101 to the PC 301 in a state of an LTE base station 201a communicating by LTE with the second communication unit 11 of the wireless terminal device 1 will be explained hereinafter.

Figure 3:
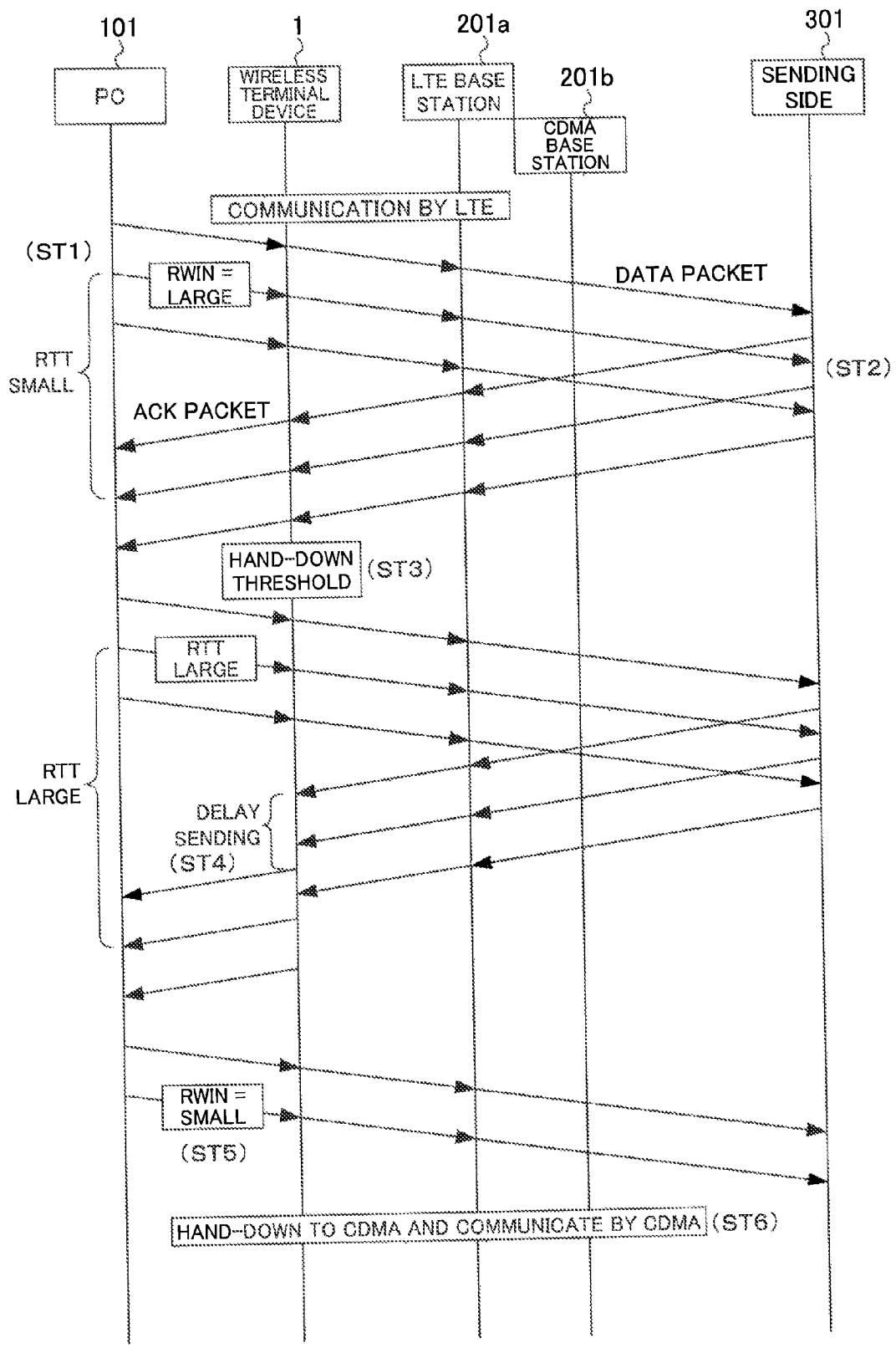
FIG. 3 is a timing chart presented in the explanation of operations when using the wireless terminal device to send data packets to an other party's PC via a network.

After having established communication by the LTE standard with the LTE base station 201a by the second communication unit 11, the wireless terminal device 1 sends data packets to the PC 301 in a state in which the size of RWIN of the PC 101 is set to "large", as shown in FIG. 3 (ST1).

The PC 301 replies with an ACK packet notifying of receipt, in a case of a data packet having been received via the network 202 (ST2). In a case of having receiving the ACK packet within a fixed time period, the PC 101 determines that RTT is short and does not change the size of RWIN.

Herein, in a case of having detected that communication standard hand-down from LTE to CDMA will occur (ST3), the wireless terminal device 1 delays an ACK packet sent from the PC 301 by a predetermined time so as to make the RTT detected by the PC 101 to be large, and then sends the ACK packet to the PC 101 after delaying. Herein, "in a case of having detected that hand-down will occur" indicates a case in which a reception signal intensity of LTE declining to a threshold slightly above a threshold at which hand-off should be performed, in a case of there not being another LTE base station that can be handed off, for example.

If it is detected that reception of the ACK packet is delayed, the PC 101 determines that the RTT is too large, and changes the size of RWIN from the large value to a small value (ST5).

Then, the wireless terminal device 1 switches from the second communication unit 11 to the first communication unit 10, and executes hand-down from LTE to CDMA (ST6).

By configuring in this way, since the ACK packet sent from the PC 301 to the PC 101 is delayed by a predetermined time and then sent, the wireless terminal device 1 can make the size of RWIN of the PC 101 be adjusted to the optimum value (small value) prior to hand-down from LTE to CDMA being executed, and thus can maintain efficient throughput.

Example 2

Next, a case of sending data packets from the PC 301 to the PC 101 in a state of the LTE base station 201a communicating by LTE with the second communication unit 11 of the wireless communication device 1 will be explained.

Figure 4:
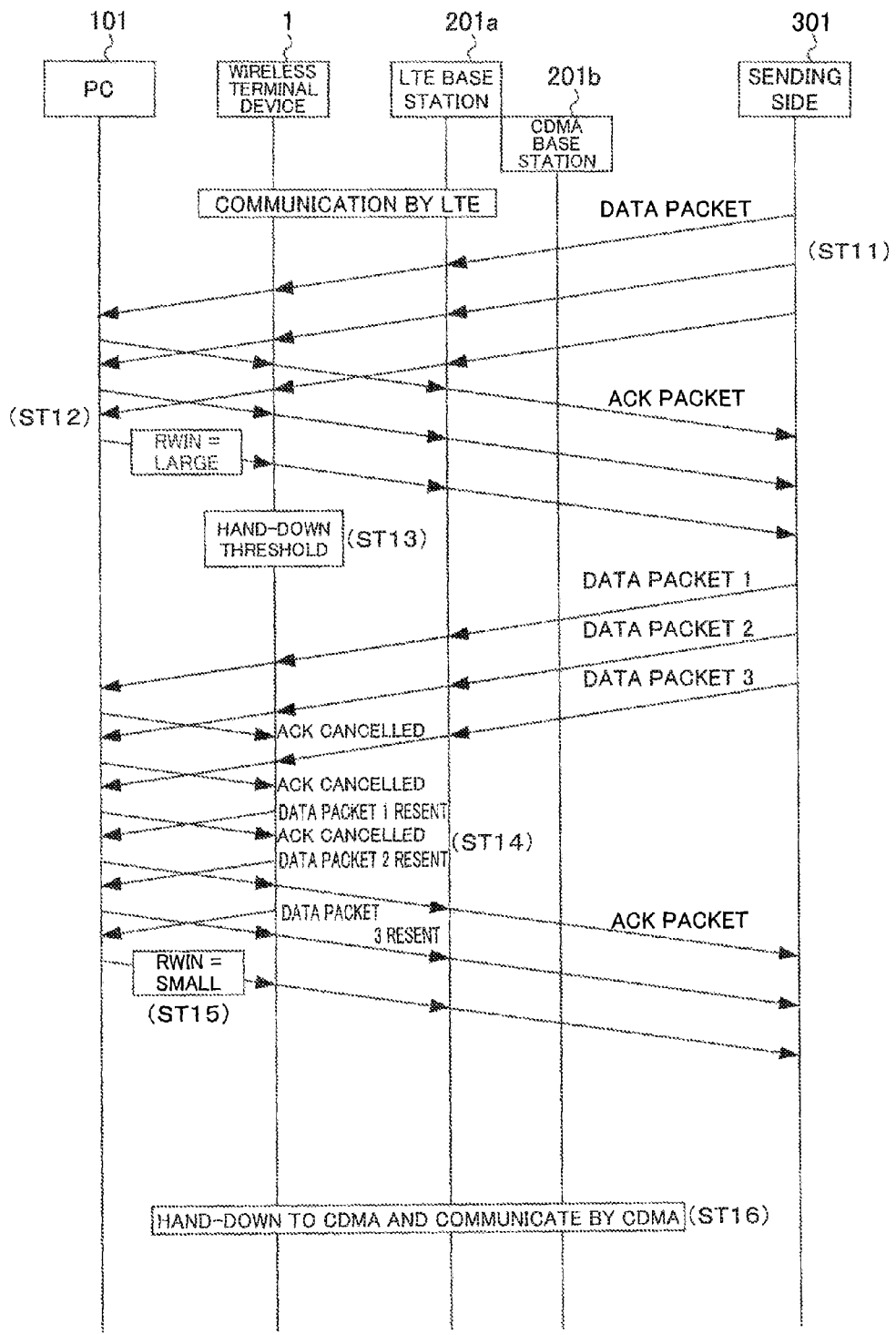
FIG. 4 is a timing chart presented in the explanation of operations when data packets are sent from the other party PC via the network using the wireless terminal device.

After the wireless terminal device 1 carries out establishment of communication by the LTE standard with the LTE base station 201a by the second communication unit 11, the data packet is sent from the PC 301 to the PC 101 via the network 202 in a state in which the size of RWIN of the PC 101 is set to "large", as shown in FIG. 4 (ST11).

The PC 101 replies with the ACK packet notifying receipt in a case of having received a data packet via the network 202 (ST12).

Herein, in a case of having detected that communication standard hand-down from LTE to CDMA will occur (ST13), the wireless terminal device 1 cancels the ACK packet sent from the PC 101, and resends to the PC 101 identical data to the data sent to the PC 101 from the PC 301 in Step ST11 (ST14). In other words, in a case of reaching the threshold for hand-down, the wireless terminal device 1 copies and retains the data packet from the PC 301 in memory (not illustrated), and resends the data packet copied to the memory while cancelling receipt of the ACK packet from the PC 101. It should be noted that the "case of having detected that hand-down will occur" in ST13 indicates a case of the reception signal intensity of LTE having declined to a threshold slightly above the threshold to perform hand-off, in a state of there not being another LTE base station that can be handed off, for example.

Since identical data is resent irrespective of the ACK packet having been resent, the PC 101 recognized that the line quality of the network 202 has degraded, and changes RWIN to "small" (ST15).

In this case, since the ACK packet from the PC 101 arrives after being delayed by a predetermined time, the PC 301 determines that the RTT is too large, adjusts the size of RWIN to the optimum value (small value), and will send data packets of small volume.

Then, the wireless terminal device 1 switches from the second communication unit 11 to the first communication unit 10, and executes hand-down from LTE to CDMA (ST16). More specifically, the wireless terminal device 1 cuts communication between the second communication unit 11 and the LTE base station 201*a*, establishes communication with a CDMA base station 201*b* by the first communication unit 10, and carries out communication by the CDMA standard.

By configuring in this way, since a signal requesting resending of the ACK packet is sent to the PC 101, the wireless terminal device 1 can have the size of RWIN of the PC 101 be adjusted to the optimum value (small value) prior to hand-down from LTE to CDMA being executed, and thus can maintain efficient throughput.

Figure 5:
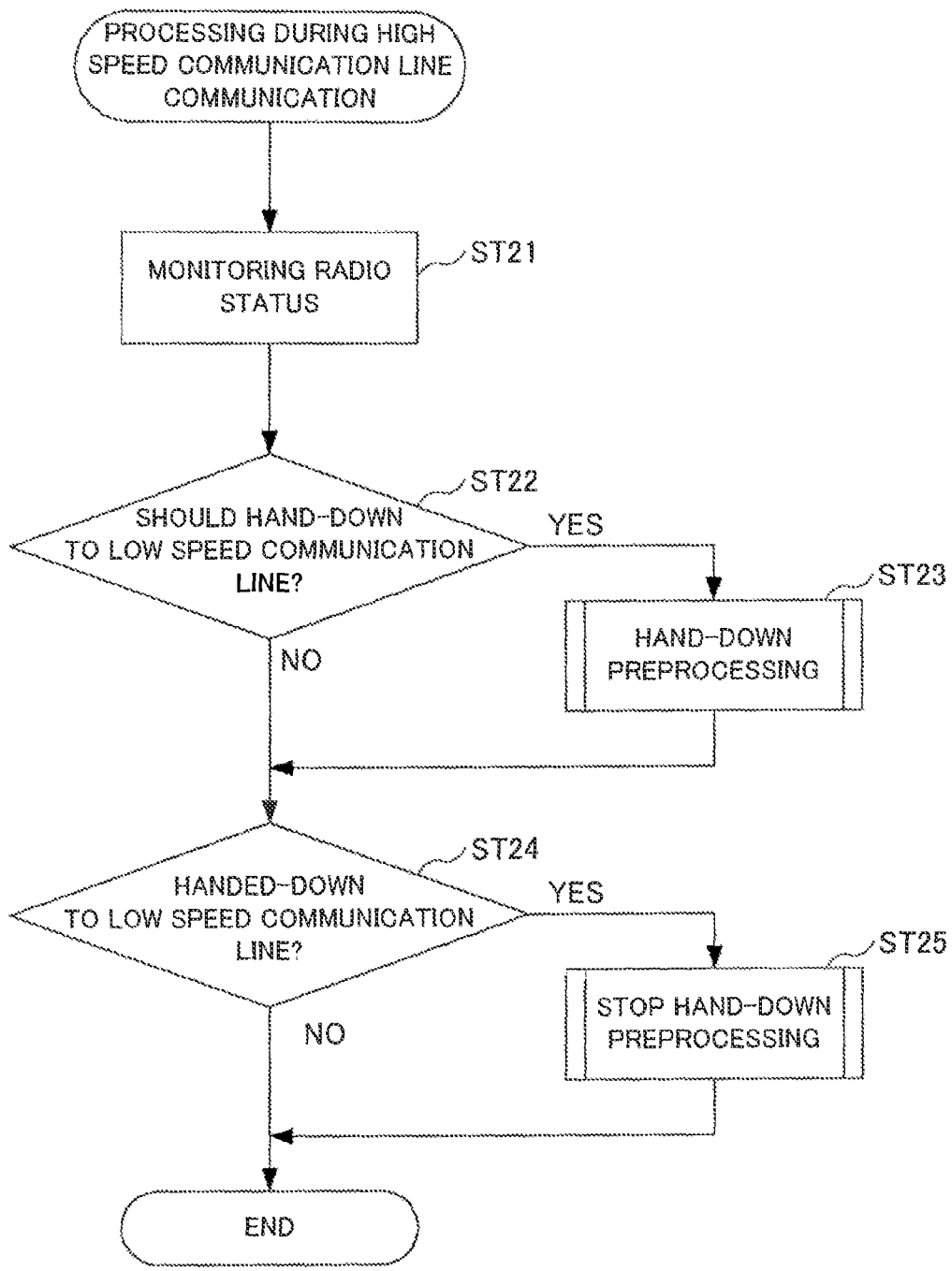
FIG. 5 is a flowchart presented in the explanation of operations of a control unit when the communication of data is being performed by way of a high speed communication line according to the LTE standard.

Next, operations of the control unit 12 when performing communication of data by way of a high speed communication line according to the LTE standard will be explained referring to the flowchart shown in FIG. 5. It should be noted that communication line according to the LTE standard refers to a high speed communication line, and communication line according to the CDMA standard refers to a low speed communication line.

In Step ST21, the communication unit 12 monitors the radio status. More specifically, the control unit 12 confirms the reception signal intensity of LTE communication by the second communication unit 11.

In Step ST22, the control unit 12 determines whether it is a situation in which hand-down from a high speed communication line to a low speed communication line is executed. In other words, in the present step, the control unit 12 determines whether it is a case in which another LTE base station with a better signal state is not present in the locality, and the signal state of the LTE base station currently location registered has declined to close to the threshold of hand-off. In addition, a value slightly more preferable than the threshold of hand-off is set as the value of the signal at this time.

In a case of having determined to be a state in which hand-down is executed (YES), the processing advances to Step ST23. In a case of having determined not to be a state in which hand-down is executed (NO), the processing advances to Step ST24.

In Step ST23, the control unit 12 executes processing prior to executing hand-down (hand-down preprocessing). Although described later, regarding the details of hand-down preprocessing, processing for causing data received from the network 202 side via the second communication unit 11 to be delayed by a predetermined time and sending to the PC 101, processing of cancelling a reception confirmation signal (ACK packet) without sending to the network 202 side via the second communication unit 11 and resending the data received from the network 202 side to the PC 101, or similar processing corresponds to hand-down preprocessing.

In Step ST24, the control unit 12 determines whether the signal state has subsequently declined further, and hand-down from a high speed communication line to a low speed communication line has been executed. In a case of having determined that hand-down has actually been executed (YES), the processing advances to Step ST25. In a case of having determined that the signal state is improved or equal and hand-down is not actually executed (NO), the processing ends.

In Step ST25, the control unit 12 stops the hand-down preprocessing in a case of the hand-down preprocessing to execute Step ST23 is continuing.

By configuring in this way, the wireless terminal device 1 can control so that the size of RWIN of the PC 101 is changed to the optimum value prior to hand-down (hand-off) from a high speed communication line to a low speed communication line being executed.

Figure 6:
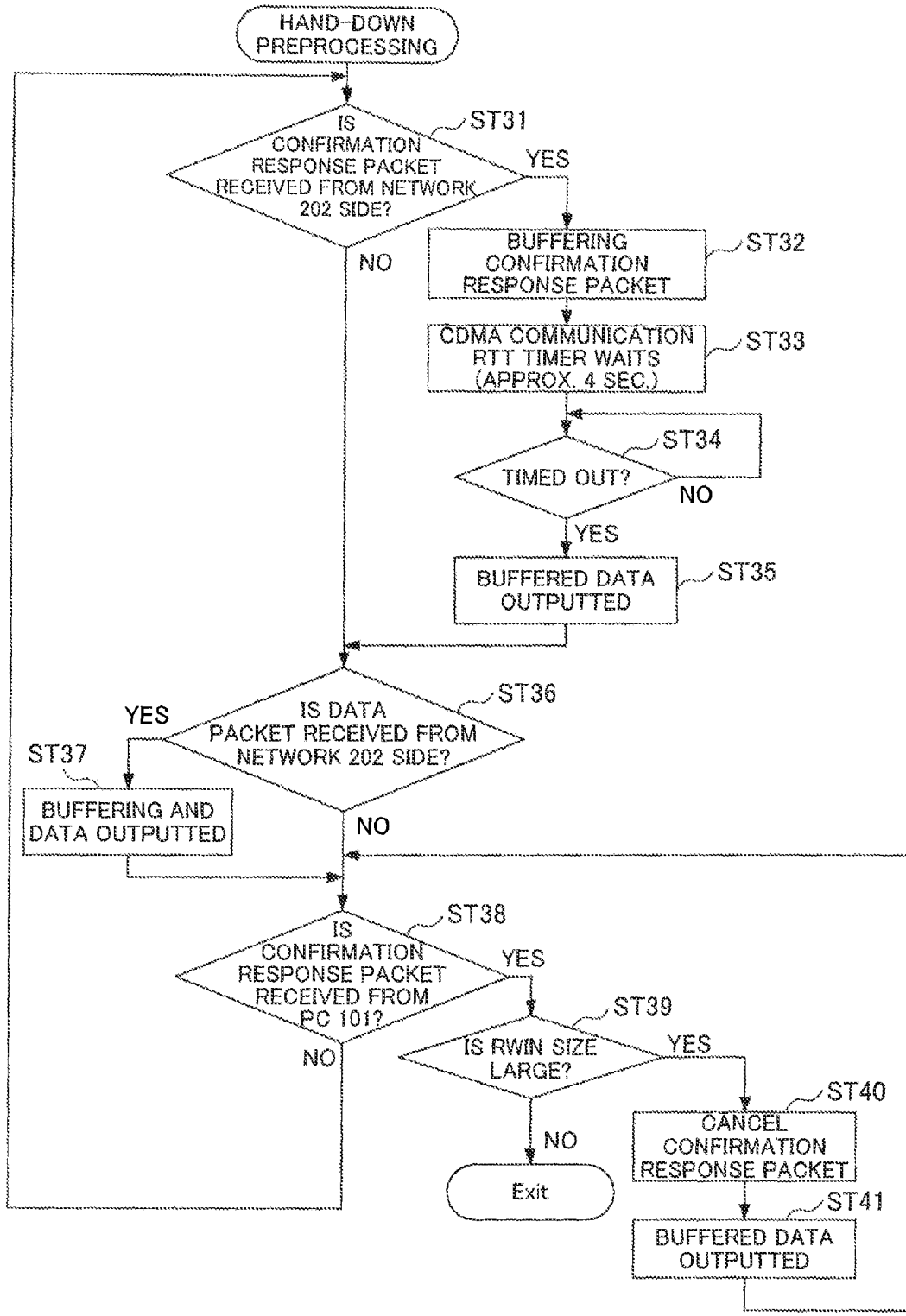
FIG. 6 is a flowchart presented in the explanation of the details of hand-down pre-processing.

Next, the details of the hand-down preprocessing executed in Step ST23 will be explained referring to the flowchart shown in FIG. 6.

In Step ST31, the control unit 12 confirms whether a confirmation response packet (ACK packet) has been received from the network 202 side. In a case of the confirmation response packet being received (YES), the processing advances to Step ST32. In a case of a confirmation response packet not being received (NO), the processing advances to Step ST36.

In Step ST32, the control unit 12 buffers the confirmation response packet in the memory. In other words, the control unit 12 does not immediately send the confirmation response packet to the PC 101.

In Step ST33, the control unit 12 starts an RTT timer of CMDA communication. The set value of the RTT timer is 4 seconds, for example.

In Step ST34, the control unit 12 determines whether the timer started in Step ST33 has timed out (whether the 4 seconds set have elapsed). In a case of having determined to have timed out (YES), the processing advances to Step ST35. In a case of having determined to not have timed out (NO), the processing repeats Step ST34.

In Step ST35, the control unit 12 sends the confirmation response packet buffered in Step ST32 to the PC 101. In other words, the PC 101 delays the confirmation response packet by a predetermined time (e.g., 4 seconds), and then sends it.

In Step ST36, the control unit 12 confirms whether a data packet has been received from the network 202 side. In a case of the data packet being received (YES), the processing advances to Step ST37. In a case of a data packet not being received (NO), the processing advances to Step ST38.

In Step ST37, the control unit 12 buffers the data packet received from the network 202 side in the memory, and then sends it to the PC 101.

In Step ST38, the control unit 12 determines whether a response confirmation packet (ACK packet) has been received from the PC 101. In a case of having determined that the response confirmation packet was received (YES), the processing advances to Step ST39. In a case of having determined that a response confirmation packet was not received (NO), the processing returns to Step ST31. It should be noted that the control unit 12 may end the processing in the case of having determined that a response confirmation packet was not received. In addition, in Step ST38, the control unit 12 buffers the response confirmation packet in the memory, and does not send to the network 202 side.

In Step ST39, the control unit 12 determines whether the size of RWIN of the PC 101 is a value that is too large, i.e. whether it is the optimum value. In a case of having determined that the size of RWIN is too large, i.e. not the optimum value (YES), the processing advances to Step ST40. In a case of having determined that the size of RWIN is not large enough, i.e. is the optimum value (NO), the control unit 12 sends the response confirmation packet buffered in the memory in Step ST38 to the network 202 side, and then ends the processing.

In Step ST40, the control unit 12 cancels the response confirmation packet received in Step ST38 (deletes from the memory). In other words, the response confirmation packet is not sent to the network 202 side.

In Step ST41, the control unit 12 sends the data buffered in the memory in Step ST37 to the PC 101 again. Subsequently, the processing returns to Step ST38.

By configuring in this way, the wireless terminal device 1 can control so that the size of RWIN of the PC 101 is changed to the optimum value prior to hand-down (hand-off) from a high speed communication line to a low speed communication line being executed.

Figure 7:
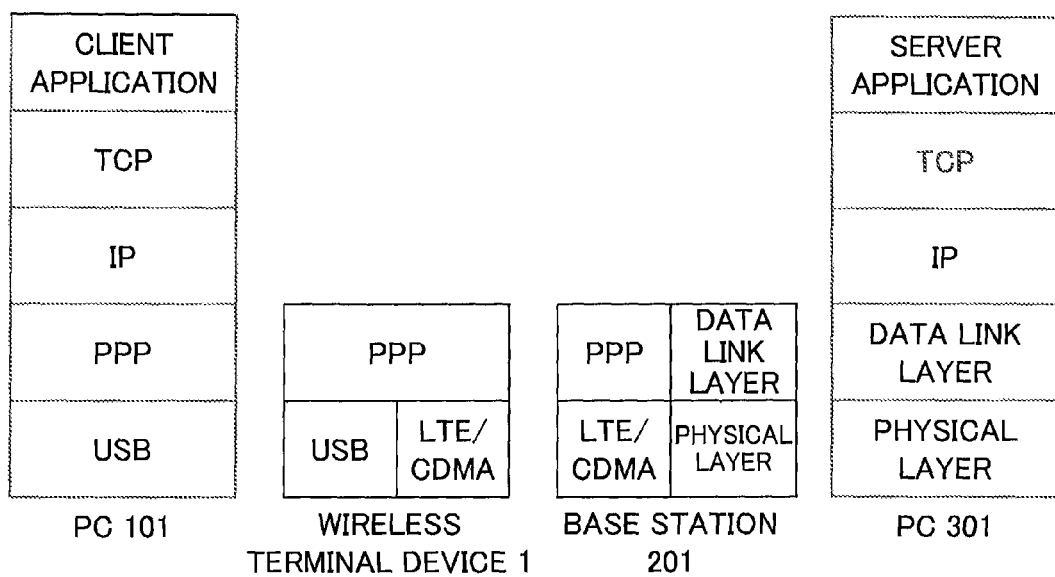
FIG. 7 is a diagram showing the layered structure of communication protocol.

In addition, an exemplary layer structure of the communication protocol between the PC 101 and the PC 301 is shown in FIG. 7. The PC 101 and the wireless terminal device 1 are connected to include USB in a physical layer and PPP in a data link layer. In addition, the wireless terminal device 1 and the LTE base station 201*a* or CDMA base station 201*b* are connected to include LTE or CDMA in the physical layer and PPP in the data link layer. Furthermore, the PC 101 and the PC 301 are connected to include IP in the network layer and TCP in the transport layer, and further there are higher-order client applications and server applications therebetween.

What is claimed is:

1. A wireless terminal device comprising:
   a first communication unit that is connected to an external device and performs communication with a network side at a first communication speed;
   a second communication unit that is connected to the external device and performs communication with the network side at a second communication speed that is faster than the first communication speed; and
   a control unit that reciprocally switches between the first communication unit and the second communication unit,
   wherein the control unit causes data received from the network side via the second communication unit to be delayed by a predetermined time and then sends to the external device, in a case of performing switching from the second communication unit to the first communication unit,
   wherein the control unit cancels a reception confirmation signal sent from the external device and resends data received from the network side to the external device, in a case of performing the switching from the second communication unit to the first communication unit, and
   wherein the reception confirmation signal indicates that reception of data ended normally.

2. A wireless terminal device according to claim 1,
   wherein the control unit stops processing to resend data received from the network side to the external device after performing switching from the second communication unit to the first communication unit.

3. A wireless terminal device according to claim 1, wherein the control unit cancels the reception confirmation signal at the switching from the second communication unit to the first communication unit, and
   wherein the control unit stops the processing of resending data received from the network side to the external device, in a case where an interval of sending a reception confirmation signal from the external device to the network side does not change even if the data received from the network side is resent to the external device.

4. A wireless terminal device comprising:
   a first communication unit that is connected to an external device and performs communication with a network side at a first communication speed;
   a second communication unit that is connected to the external device and performs communication with the network side at a second communication speed that is faster than the first communication speed; and
   a control unit that reciprocally switches between the first communication unit and the second communication unit,
   wherein the control unit causes data received from the network side via the second communication unit to be delayed by a predetermined time and then sends to the external device, in a case of performing switching from the second communication unit to the first communication unit, and
   wherein the control unit initiates processing to cause the data to be delayed by a predetermined time before performing switching from the second communication unit to the first communication unit, and stops the processing to cause the data to be delayed by a predetermined time after performing switching.

5. A wireless terminal device comprising:
   a first communication unit that is connected to an external device and performs communication with a network side at a first communication speed;
   a second communication unit that is connected to the external device and performs communication with the network side at a second communication speed that is faster than the first communication speed; and
   a control unit that reciprocally switches between the first communication unit and the second communication unit,
   wherein the control unit causes data received from the network side via the second communication unit to be delayed by a predetermined time and then sends to the external device, in a case of performing switching from the second communication unit to the first communication unit,
   wherein the control unit sends data received from the network side via the second communication unit to the external device with a predetermined time delay at the switching from the second communication unit to the first communication unit, and
   wherein the control unit stops the processing of the predetermined time delay, in a case where an interval of sending a reception confirmation signal from the external device to the network side does not change even if a predetermined time period elapses after the predetermined time delay.

6. A wireless terminal device comprising:
   a first communication unit that is connected to an external device and performs communication with a network side at a first communication speed;
   a second communication unit that is connected to the external device and performs communication with the network side at a second communication speed that is faster than the first communication speed; and
   a control unit that reciprocally switches between the first communication unit and the second communication unit,
   wherein the control unit cancels a reception confirmation signal sent from the external device and resends data received from the network side to the external device, in a case of performing the switching from the second communication unit to the first communication unit, and wherein the reception confirmation signal indicating that reception of data ended normally.

7. A wireless terminal device according to claim 6, wherein the control unit stops processing to resend data received from the network side to the external device after performing switching from the second communication unit to the first communication unit.

8. A wireless terminal device according to claim 6,
wherein the control unit sends data received from the network side via the second communication unit to the external device with a predetermined time delay at the switching from the second communication unit to the first communication unit, and
wherein the control unit stops the processing of the predetermined time delay, in a case where an interval of sending a reception confirmation signal from the external device to the network side does not change even if a predetermined time period elapses after the predetermined time delay.

9. A method for controlling a wireless terminal device including: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, the method comprising the steps of:
delaying data received from the network side via the second communication unit by a predetermined time, in a case of the control unit performing switching from the second communication unit to the first communication unit;
sending the data received from the network side to the external device, after being delayed by a predetermined time in the delaying step;
cancelling a reception confirmation signal sent from the external device, in a case of the control unit performing switching from the second communication unit to the first communication unit; and
resending the data received from the network side to the external device
indicating that reception of data ended normally.

10. A method for controlling a wireless terminal device including: a first communication unit that is connected to an external device and performs communication with a network side at a first communication speed; a second communication unit that is connected to the external device and performs communication with the network side at a second communication speed that is faster than the first communication speed; and a control unit that reciprocally switches between the first communication unit and the second communication unit, the method comprising the steps of:
cancelling a reception confirmation signal sent from the external device ended normally, in a case of the control unit performing switching from the second communication unit to the first communication unit; and
resending the data received from the network side to the external device, and
wherein the reception confirmation signal indicates that reception of data ended normally.

* * * * *